United States Patent [19]

Becker et al.

[11] Patent Number: 4,805,340

[45] Date of Patent: Feb. 21, 1989

[54] HUMANE GLUE TRAP FOR RATS, MICE AND OTHER VERMIN HAVING CARBOMAL IN THE BAIT

[75] Inventors: Jerome Becker, Brooklyn, N.Y.; Robert E. Connolly, Parsippany, N.J.

[73] Assignee: Tamby Chemical Corp., Brooklyn, N.Y.

[21] Appl. No.: 159,779

[22] Filed: Feb. 24, 1988

[51] Int. Cl.$^4$ ............................................. A01M 1/14
[52] U.S. Cl. .......................................... 43/58; 43/124
[58] Field of Search .................. 43/58, 114, 124, 131, 43/136

[56] References Cited

U.S. PATENT DOCUMENTS

| | | | |
|---|---|---|---|
| 2,518,819 | 8/1950 | Roessler . | |
| 2,962,836 | 12/1960 | Hughes | 43/58 |
| 3,864,866 | 2/1975 | Kosinsky | 43/58 |
| 4,161,079 | 7/1979 | Hill | 43/58 |
| 4,266,364 | 5/1981 | McBride | 43/90 |
| 4,369,176 | 1/1983 | Ott | 424/84 |
| 4,425,731 | 1/1984 | Orlando | 43/58 |
| 4,438,584 | 3/1984 | Baker et al. | 43/58 |
| 4,446,648 | 5/1984 | Teranishi et al. | 43/131 |
| 4,599,822 | 7/1986 | Baker | 43/114 |
| 4,685,244 | 8/1987 | Marks | 43/58 |

FOREIGN PATENT DOCUMENTS

| | | |
|---|---|---|
| 1201585 | 3/1986 | Canada . |
| 45092 | 2/1982 | European Pat. Off. ............. 43/58 |
| 0045092 | 2/1982 | European Pat. Off. . |
| 2534469 | 4/1984 | France ............................... 43/58 |
| T38792 | 7/1986 | Hungary . |

OTHER PUBLICATIONS

Broome, "Glue Traps for Rodents," *Pest Control Technology*, pp. 14–16, Oct. 1977.

Frederickson and Trautman, "Use of Drugs for Capturing and Handling Pheasants," *J. Widl. Manage*, 42(3):1978.

Whately, "Selective Capture of Spotted Hyenas Using Orally Administered Sernylan," *Zoological Record*, vol. 116, pp. 25-27 (1979).

*Primary Examiner*—M. Jordan
*Attorney, Agent, or Firm*—Morgan & Finnegan

[57] ABSTRACT

A glue trap which reduces the suffering of entrapped animals through the addition of a bait containing carbromal that will calm the animal.

4 Claims, No Drawings

HUMANE GLUE TRAP FOR RATS, MICE AND OTHER VERMIN HAVING CARBOMAL IN THE BAIT

BACKGROUND OF THE INVENTION

This invention relates to traps for rats, mice, and other vermin which use an adhesive substance to ensnare and entangle the target pest. These traps are commonly referred to as "glue traps." Examples of such traps are described in "Glue Traps for Rodents," *Pest Control Technology*, October, 1977, and in U.S. Pat. No. 4,438,584, the disclosures of which are hereby incorporated by reference. One drawback of such prior art glue traps is the significant torment that the target pest undergoes in trying to extricate itself from the trap. Such traps have become the subject of protests by animal rights groups and humane societies.

SUMMARY OF THE INVENTION

The present invention is an improved glue trap which presents the target pest with an alluring bait which contains a substance, when ingested, which is capable of calming the trapped pest.

DETAILED DESCRIPTION OF THE INVENTION

The present invention comprises a substrate, an adhesive substance which is applied to the substrate, and a bait attractive to the target pest to which a calming substance, such as an animal tranquilizer, sedative, hypnotic, or anesthetizing agent, has been added in an amount sufficient to calm the trapped pest when it ingests the bait and/or calming substance. The substrate may be, but is not limited to, cardboard, metal, or a polymeric material, but it is preferred to use a polymeric material for economy and ease of fabrication. The polymeric material is most preferably molded as a tray containing a recessed portion to retain the adhesive substance.

The calming substance may be any substance known to produce a calming effect when ingested by the target pest. For rats and mice, carbromal[N-(Aminocarbonyl)-2-bromo-2-ethylbutanamide] and its salts and derivatives such as acetylcarbromal[a-bromo-a-ethylbutyrlacetylurea], bromisovalum[a-bromoisovalerylurea] and diethylbromo acetamide[a-bromo-a,a-diethylacetamide] and their salts are preferred.

The bait may be any food substance which is attractive to the target pest and is capable of being mixed with, coated by, or otherwise comingled with the calming substance. The bait may also be a non-food substance which is attractive to the target pest due to its aroma or appearance and which causes the target pest to attempt to bite or lick the bait thus causing the ingestion of the calming substance which has been mixed with, coated on, or otherwise comingled with the non-food substance. It is preferred to use pelletized, commercially available animal food which may be readily coated with a powdered or liquid calming substance.

The adhesive substance may be any tacky material capable of ensnaring and entangling the target pest when applied to the substrate in sufficient depth. Examples of useful adhesive substances are pressure sensitive adhesives of the hot-melt type or solvent-based type, either with or without the addition of deliberately entrapped bubbles. Where the adhesive substance is applied by the manufacturer rather than by the user, it is preferred that the adhesive substance should have a flow temperature which is greater than the highest temperature to which the trap may be expected to be exposed during shipment or storage.

I claim:

1. A glue trap for rats, mice or other vermin comprising a polymeric substrate, an adhesive substance held by said substrate, and a pelletized animal food held by said adhesive substance which contains carbromal in an amount sufficient to calm the trapped pest when it ingests said carbromal.

2. A glue trap for rats, mice or other vermin comprising a substrate, an adhesive substance held by said substrate, and a bait held by said adhesive substance which contains a calming substance selected from the group consisting of carbromal, acetylcarbromal, bromisovalum, diethylbromo acetamide, and their salts in an amount sufficient to calm the trapped pest when it ingests said calming substance.

3. A glue trap according to claim 2 wherein said calming substance is selected from the group consisting of carbromal and its salts.

4. A glue trap according to claim 2 wherein said calming substance is carbromal.

* * * * *

UNITED STATES PATENT AND TRADEMARK OFFICE
CERTIFICATE OF CORRECTION

PATENT NO. : 4,805,340
DATED : February 21, 1989
INVENTOR(S) : Jerome Becker et al.

It is certified that error appears in the above-identified patent and that said Letters Patent is hereby corrected as shown below:

In the title at [54] "CARBOMAL" should read --CARBROMAL--.

Column 1, line 3 "CARBOMAL" should read --CARBROMAL--.

Signed and Sealed this

Twenty-ninth Day of August, 1989

Attest:

DONALD J. QUIGG

*Attesting Officer*  *Commissioner of Patents and Trademarks*